(12) United States Patent
Thanayankizil et al.

(10) Patent No.: US 9,913,081 B1
(45) Date of Patent: Mar. 6, 2018

(54) METHOD AND DEVICE FOR COMMUNICATING WITH A VEHICLE SYSTEM MODULE WHILE CONSERVING POWER BY USING TWO DIFFERENT SHORT RANGE WIRELESS COMMUNICATION (SRWC) PROTOCOLS

(71) Applicant: GM GLOBAL TECHNOLOGY OPERATIONS LLC, Detroit, MI (US)

(72) Inventors: Lakshmi V. Thanayankizil, Rochester Hills, MI (US); Wen Gu, Novi, MI (US); Nadav Lavi, Ramat-Hasharon (IL)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/292,738

(22) Filed: Oct. 13, 2016

(51) Int. Cl.
| | |
|---|---|
| *H04W 4/00* | (2009.01) |
| *H04W 76/04* | (2009.01) |
| *H04B 1/3822* | (2015.01) |
| *H04L 12/40* | (2006.01) |

(52) U.S. Cl.
CPC .......... *H04W 4/008* (2013.01); *H04B 1/3822* (2013.01); *H04W 76/046* (2013.01); *H04L 2012/40273* (2013.01)

(58) Field of Classification Search
CPC ... H04W 76/046; H04B 1/005; H04B 1/3822; H04B 1/082; G06F 8/65; G06F 8/61; G06F 8/60
See application file for complete search history.

(56) References Cited

U.S. PATENT DOCUMENTS

| | | | | |
|---|---|---|---|---|
| 8,503,637 | B1* | 8/2013 | Kirchhoff | H04M 3/42195 379/142.01 |
| 8,705,707 | B1* | 4/2014 | Schilit | 379/201.07 |
| 9,521,238 | B1* | 12/2016 | Thanayankizil | H04M 1/7253 |
| 2002/0019877 | A1* | 2/2002 | Wrede | G06F 8/61 709/230 |
| 2003/0007625 | A1* | 1/2003 | Pines | H04M 3/42008 379/223 |
| 2004/0254689 | A1* | 12/2004 | Blazic | G06F 8/61 701/1 |
| 2005/0074109 | A1* | 4/2005 | Hanson | H04M 3/2218 379/207.04 |
| 2005/0090941 | A1* | 4/2005 | Stefan | G07C 5/008 701/1 |

(Continued)

*Primary Examiner* — Devan Sandiford
(74) *Attorney, Agent, or Firm* — David Willoughby; Reising Ethington P.C.

(57) ABSTRACT

A vehicle gateway module adapted to communicate using short range wireless communication (SRWC) and a method of receiving data from a wireless source via a SRWC chipset in a vehicle. The method includes the steps of: detecting the wireless source using a first SRWC chipset in a gateway module in the vehicle; in response to detecting the wireless source with the first SRWC chipset, triggering a second SRWC chipset in the gateway module to wake-up by exiting a POWER OFF mode, wherein the first and second SRWC chipsets are configured to communicate according to different SRWC protocols; and in response to the triggering step: exiting the POWER OFF mode at the second SRWC chipset; and receiving content data from the wireless source at the gateway module via the second SRWC chipset.

15 Claims, 2 Drawing Sheets

(56) References Cited

U.S. PATENT DOCUMENTS

| | | | |
|---|---|---|---|
| 2005/0239518 A1* | 10/2005 | D'Agostino | G06F 1/3203 455/574 |
| 2007/0185624 A1* | 8/2007 | Duddles | G06F 8/665 701/1 |
| 2007/0260635 A1* | 11/2007 | Ramer | G06F 17/30905 |
| 2009/0119657 A1* | 5/2009 | Link, II | G06F 8/65 717/171 |
| 2009/0186629 A1* | 7/2009 | Soelberg | H04M 1/575 455/456.1 |
| 2009/0300595 A1* | 12/2009 | Moran | G06F 8/65 717/170 |
| 2010/0082559 A1* | 4/2010 | Sumcad | G06F 8/65 707/695 |
| 2010/0086111 A1* | 4/2010 | Gruchala | H04M 3/42059 379/93.17 |
| 2010/0161720 A1* | 6/2010 | Colligan | G06Q 30/02 709/203 |
| 2011/0225259 A1* | 9/2011 | Quinn | G06F 8/65 709/217 |
| 2013/0288659 A1* | 10/2013 | Hrabak | H04W 4/001 455/419 |
| 2013/0295999 A1* | 11/2013 | Wang | H04M 3/44 455/564 |
| 2013/0326495 A1* | 12/2013 | Reunamaki | G06F 8/65 717/173 |
| 2014/0051465 A1* | 2/2014 | Ruys | G08G 1/202 455/457 |
| 2014/0052330 A1* | 2/2014 | Mitchell | G06F 8/65 701/31.5 |
| 2014/0189673 A1* | 7/2014 | Stenfort | G06F 8/665 717/170 |
| 2015/0121275 A1* | 4/2015 | Marshall | G07C 5/0808 715/771 |
| 2015/0181644 A1* | 6/2015 | Ehrentraut | H04B 1/005 455/553.1 |
| 2015/0195669 A1* | 7/2015 | Grover | H04W 4/003 455/414.1 |
| 2015/0230044 A1* | 8/2015 | Paun | H04W 4/008 455/41.2 |
| 2015/0242198 A1* | 8/2015 | Tobolski | G06F 8/61 717/172 |
| 2015/0319551 A1* | 11/2015 | Grost | H04M 1/7253 455/414.1 |
| 2015/0341767 A1* | 11/2015 | Nelson | G08B 25/016 455/404.2 |
| 2016/0013934 A1* | 1/2016 | Smereka | G06F 21/572 713/171 |
| 2016/0037454 A1* | 2/2016 | Kincaid | G07C 9/00111 370/311 |
| 2016/0072947 A1* | 3/2016 | Van Rensburg | H04M 3/42042 455/415 |
| 2016/0119961 A1* | 4/2016 | Hrabak | H04W 76/023 455/41.2 |
| 2016/0266886 A1* | 9/2016 | Sarkar | G06F 8/65 |
| 2016/0323921 A1* | 11/2016 | Thanayankizil | H04W 76/023 |
| 2017/0024201 A1* | 1/2017 | Diedrich | G06F 8/65 |
| 2017/0069144 A1* | 3/2017 | Lawrie-Fussey | G07C 5/085 |
| 2017/0150490 A1* | 5/2017 | Chen | H04W 72/048 |

* cited by examiner

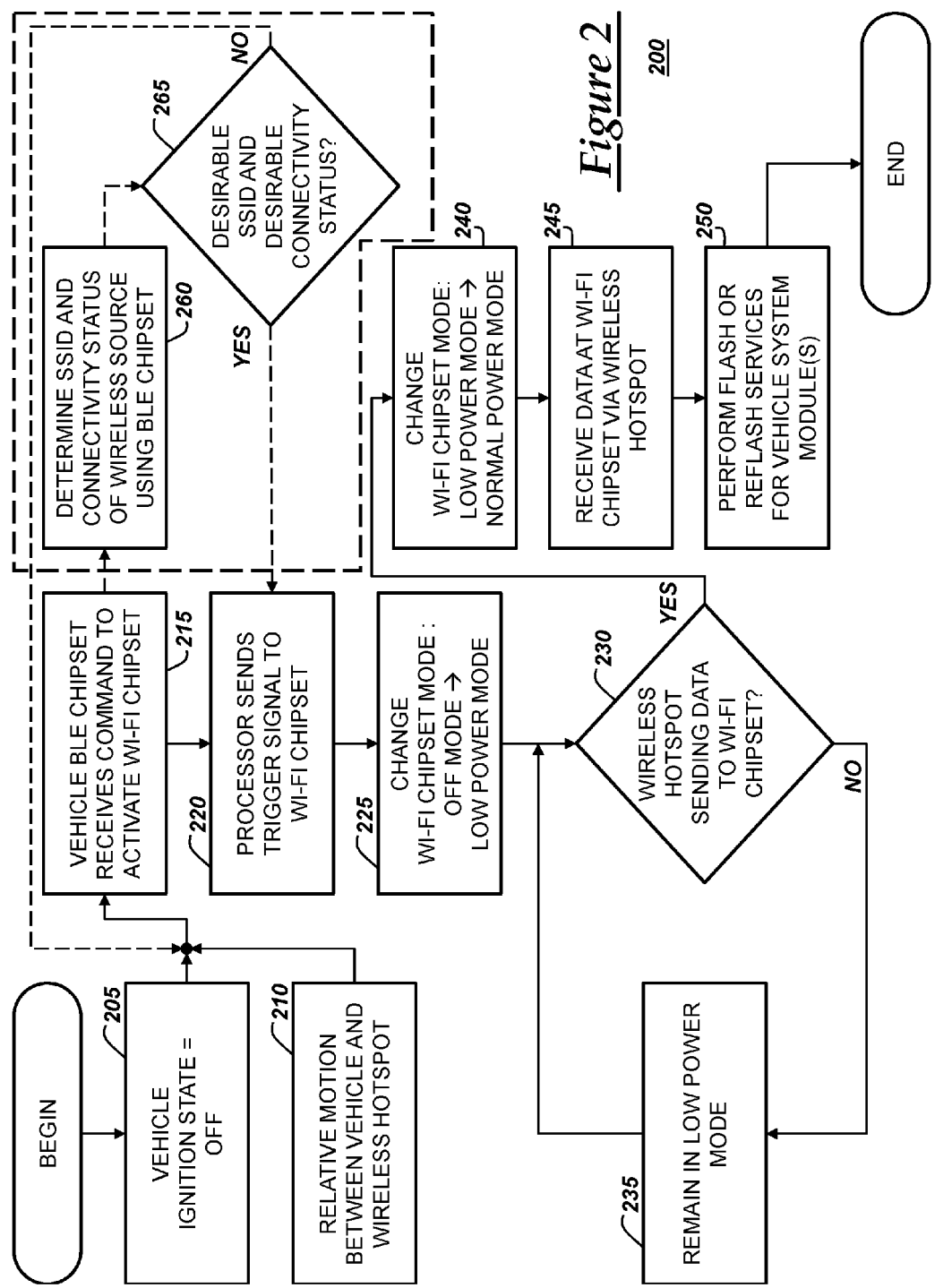

METHOD AND DEVICE FOR COMMUNICATING WITH A VEHICLE SYSTEM MODULE WHILE CONSERVING POWER BY USING TWO DIFFERENT SHORT RANGE WIRELESS COMMUNICATION (SRWC) PROTOCOLS

TECHNICAL FIELD

The present invention relates to a short range wireless communication (SRWC) module for a vehicle adapted to use two different SRWC protocols.

BACKGROUND

During manufacturing of a vehicle, in order to install an operating system, software, firmware, etc. in a particular vehicle hardware module, a technician at the manufacturer may connect a harness cable or similar device to a communication bus of the vehicle (which interconnects multiple vehicle hardware modules) or may connect the cable separately to individual hardware modules in the vehicle. After establishing a physical connection, the technician may install the OS, software, firmware, etc. on the respective device(s). Of course, in some instances, the cable may need to be disconnected and reconnected to other devices before all hardware modules are configured. This process can be time consuming and requires training of one or more technicians.

Thus, there is a need for a more efficient procedure to provide code or instructions to vehicle hardware modules.

SUMMARY

According to an embodiment of the invention, there is provided a method of receiving data from a wireless source via a short range wireless communication (SRWC) chipset in a vehicle. The method includes the steps of: detecting the wireless source using a first SRWC chipset in a gateway module in the vehicle; in response to detecting the wireless source with the first SRWC chipset, triggering a second SRWC chipset in the gateway module to wake-up by exiting a POWER OFF mode, wherein the first and second SRWC chipsets are configured to communicate according to different SRWC protocols; and in response to the triggering step: exiting the POWER OFF mode at the second SRWC chipset; and receiving content data from the wireless source at the gateway module via the second SRWC chipset.

According to another embodiment of the invention, there is provided a vehicle gateway module adapted to communicate using short range wireless communication (SRWC). The vehicle gateway module includes: a first SRWC chipset; a second SRWC chipset, wherein the first and second SRWC chipsets are configured to communicate according to different SRWC protocols; a processor coupled to the first and second SRWC chipsets; and memory coupled to the processor, said memory storing instructions executable by the processor. The instructions may include: determining at the processor that a vehicle ignition state is OFF; and in response to receiving the determination: detecting at the first SRWC chipset a wireless signal from a SRWC source while the vehicle ignition state is OFF, wherein the wireless signal includes a trigger associated with the second SRWC chipset; in response to receiving the trigger, switching the second SRWC chipset from a POWER OFF mode to a LOW POWER mode; determining that the SRWC signal is a communication intended for the second SRWC chipset; and in response the determination, switching the second SRWC chipset from the LOW POWER mode to a NORMAL mode and receiving content data from the SRWC source.

According to another embodiment of the invention, there is provided a method of receiving data from a wireless source via a short range wireless communication (SRWC) chipset in a vehicle. The method includes the steps of: detecting the wireless source using a first SRWC chipset in a gateway module in the vehicle, wherein the wireless source is located at a vehicle manufacturing facility; in response to detecting the wireless source with the first SRWC chipset, triggering a second SRWC chipset in the gateway module to wake-up by exiting a POWER OFF mode, wherein the first and second SRWC chipsets are configured to communicate according to different SRWC protocols; and in response to the triggering step: exiting the POWER OFF mode at the second SRWC chipset; receiving content data from the wireless source at the gateway module via the second SRWC chipset; and using the received content data, programming at least one vehicle system module (VSM) in the vehicle.

BRIEF DESCRIPTION OF THE DRAWINGS

One or more embodiments of the invention will hereinafter be described in conjunction with the appended drawings, wherein like designations denote like elements, and wherein:

FIG. 2 is a flow diagram of a method of receiving data from a wireless source at a short range wireless communication (SRWC) chipset in a vehicle.

DETAILED DESCRIPTION OF THE ILLUSTRATED EMBODIMENT(S)

Figure 1:
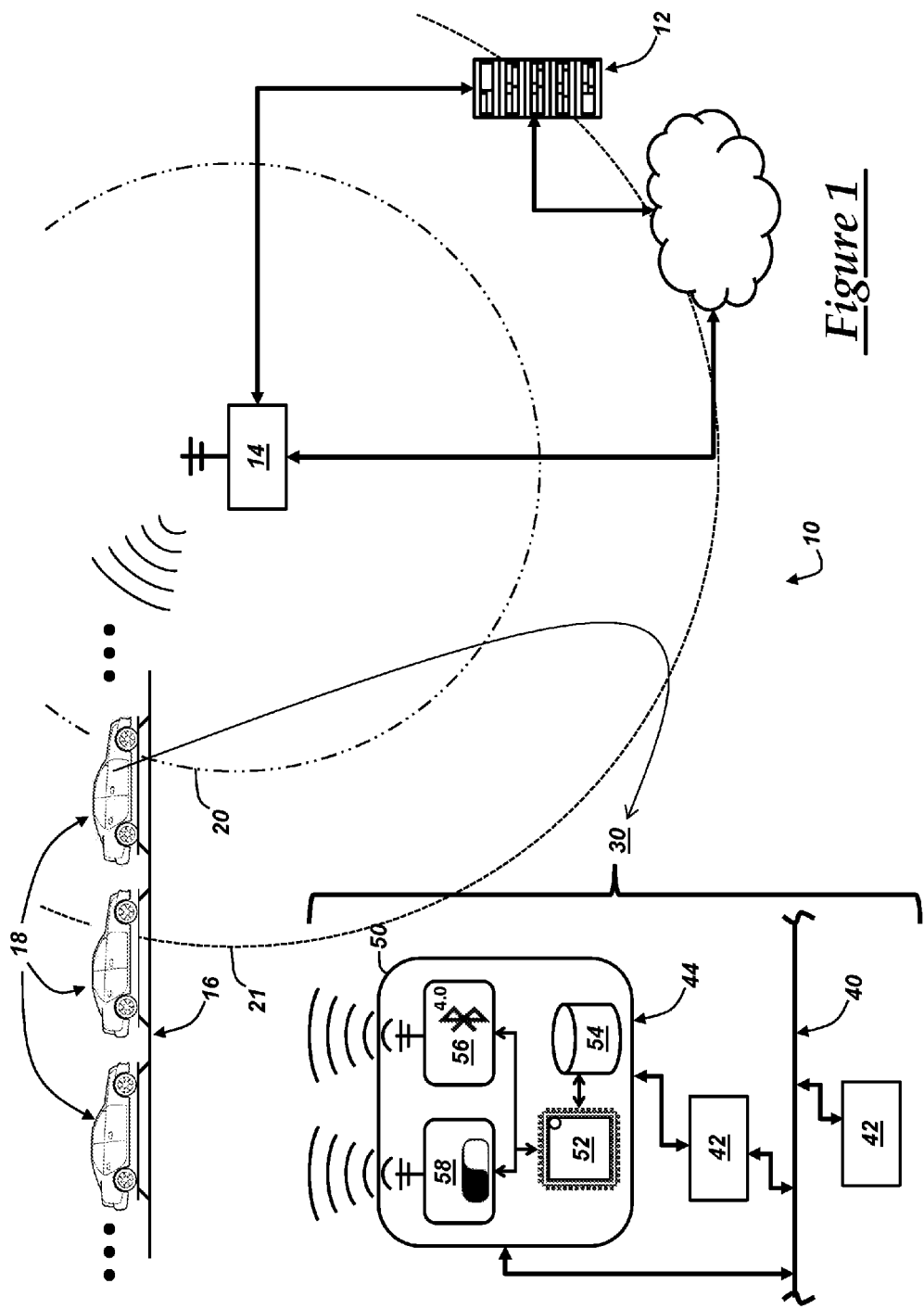
FIG. 1 is a block diagram depicting an embodiment of a communications system that is capable of utilizing the method disclosed herein.

A vehicle gateway module or gateway communication module having short range wireless communication (SRWC) capability is described below which is adapted to conserve vehicle power—e.g., including battery power when a vehicle ignition state is OFF. Skilled artisans will appreciate the use of vehicle power budgets wherein various vehicle components are allotted a predetermined amount of power while the vehicle ignition is OFF. Thus, more efficient use of this predetermined power allotment for a given hardware module may extend an operability time thereof in this vehicle state.

According to the embodiments disclosed below, the gateway module is configured with at least two different SRWC chipsets. For example, the chipsets may be a Bluetooth Low Energy (BLE) chipset and a Wi-Fi chipset. While both chipsets can be adapted to enable the vehicle to communicate when the vehicle ignition is OFF, the respective chipsets have different electrical characteristics. For example, the BLE chipset may consume less power than the Wi-Fi chipset (e.g., a power consumption rate of the BLE chipset may be less than that of the Wi-Fi chipset); however, the BLE chipset correspondingly may have a lower throughput rate (e.g., the BLE chipset may transfer data at a slower data rate than that of the Wi-Fi chipset). Correspondingly, the Wi-Fi chipset may have higher throughput rate (i.e., faster data transfer rates); however, it may consume more power over a similar period of time. As described below, the gateway module can be configured to provide higher data throughput when desired, while minimizing power consumption.

Communications System

With reference to FIG. 1, there is shown an exemplary operating environment that includes a manufacturing facility 10 that includes a server 12 coupled to a wireless source or hotspot 14 and a moving assembly line 16 of vehicles 18. In at least one implementation, the respective vehicle ignition systems are in an OFF state. As will be described more below, the server 12 may provide data wirelessly to the vehicles 18 via the source 14 even though the vehicle ignitions are OFF—e.g., when the vehicles 18, singly or collectively, enter a proximity or range 20 of a wireless signal of the source 14, the source 14 may provide data stored at the server 12 or via an internet connection 22 or the like. This data may be received by the vehicle (even in the OFF state), and the vehicle 18 may use the data to program (a.k.a., flash or reflash) hardware modules within the respective vehicle 18 at that time or later.

The environment described below is merely one implementation wherein the vehicle moves relative to a wireless source 14; other implementations exist where wireless sources move relative to the vehicle 18 or vice-versa. For example, in some vehicle embodiments (e.g., electric vehicles, partially electric, or hybrid electric vehicles), it is desirable to frequently turn vehicle power ON and OFF (e.g., as the vehicle accelerates, decelerates, turns, goes downhill, etc.). These and other instances will be appreciated by skilled artisans. In such vehicles it is generally desirable to conserve as much electrical power as possible (e.g., milli-amps matter). Thus, the system and method also could be used to conserve vehicle power in such vehicle embodiments as well.

In FIG. 1, server 12 includes any suitable computer-implemented device capable of storing data. In at least one embodiment, the server 12 stores vehicle system module (VSM) application instructions and is configured to provide these instructions to the vehicle 18 using the wireless source 14. The server 12 may include or be part of a communication network (e.g., an intranet at a vehicle manufacturing facility or the like). In some embodiments, the application instructions or other data provided by the server 12 may be retrieved by the server 18 from a remote location using the internet connection 22; however, this is not required.

The wireless source or SRWC source 14 may be coupled to the server 12 via any suitable wired or wireless connection (e.g., an Ethernet cable, coaxial cable, or the like). The wireless hotpot 14 may include a short range wireless communication (SRWC) transceiver that communicates via multiple SRWC protocols. More particularly, in one embodiment, the source 14 may act as a server or host device to SRWC client devices. For example, the source 14 may operate as a Bluetooth hotspot or source (having a first wireless range 20), and the vehicle 18 may act as a Bluetooth client. And for example, the source 14 also may operate as a Wi-Fi hotspot or source (having a second wireless range 21), and the vehicle 18 may act as a Wi-Fi client. The server 12 and source 14 may be combined, or they may be separate units, as shown.

Each vehicle 18 may have a communication system 30 that includes a network communication link or connection 40, one or more vehicle system modules (VSMs) 42, and a gateway or gateway communication module (GCM) 44 that includes one or more short range wireless communication (SRWC) capabilities. Vehicle 18 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used.

The connection 40 may include any wired intra-vehicle communications system for connecting or coupling the VSMs 42 and other vehicle electronic devices to one another. According to one embodiment, the connection 40 comprises a data bus (e.g., a communication bus, entertainment bus, etc.). Non-limiting examples of suitable network connections include a controller area network (CAN), a media oriented system transfer (MOST), a local interconnection network (LIN), a local area network (LAN), and other appropriate connections such as Ethernet, Audio-Visual Bridging (AVB), or others that conform with known ISO, SAE and IEEE standards and specifications, to name but a few.

The vehicle system modules (VSMs) 42 can be any modular hardware device designed to execute or perform categorical vehicle functions or tasks, or functions or tasks in a particular zone or area of the vehicle 18 (e.g., a front region, a rear region, a side region, etc.). Each VSM 42 may be coupled to various local hardware components, may have suitable control electronics (e.g., including a local processor, local memory, instructions or code stored on local memory that is executable by the respective local processor, etc.). Further, VSMs 42 may have any suitable electrical interface for communicating over network connection(s) 40.

Non-limiting examples of other VSMs 42 include a GPS module, an engine control module (ECM), a body control module (BCM), a powertrain control module (PCM), and the like, all of which are known in the art. For example, in some implementations, a GPS module may determine a vehicle position that is used for providing navigation and other position-related services; further, such information may be provided to users of vehicle 18. The ECM automatically may control various aspects of engine operation such as fuel ignition and ignition timing. In addition, the ECM could be equipped with on-board diagnostic features that provide myriad real-time data, such as that received from various sensors including vehicle emissions sensors, and may provide a standardized series of diagnostic trouble codes (DTCs) that allow a technician to rapidly identify and remedy malfunctions within the vehicle 18. In some implementations, the BCM may govern various electrical components located throughout the vehicle 18, like the vehicle's power door locks and headlights, which may be automated, user-actuated, or a combination thereof. And the PCM could be configured to regulate operation of one or more components of the vehicle powertrain. These of course are merely examples of vehicle system modules 42; other embodiments exist.

The gateway module 44 may include a circuit card 50 that carries a processor 52, memory 54, a first SRWC chipset 56 (e.g., a Bluetooth Low Energy (BLE) chipset), and a second SRWC chipset 58 (e.g., a Wi-Fi chipset). Other chipset implementations are also possible. For example, chipsets 56, 58 also could utilize other SRWC protocols, including one of a Bluetooth protocol, Wi-Fi Direct protocol, a Near-Field Communication or NFC protocol, etc. (thus, BLE and Wi-Fi are merely examples). In some implementations, the gateway module 44 may be part of a vehicle head unit (e.g., infotainment unit) and may have a user interface (e.g., having control knobs, buttons, display, etc.)—e.g., being part of the center stack module; however, this is not required.

The processor 52 can be any type of device capable of processing and/or executing instructions, including microprocessors, microcontrollers, host processors, controllers, vehicle communication processors, and application specific integrated circuits (ASICs). It may be a dedicated processor (used only for chipsets 56, 58), or it can be shared with other vehicle systems. For example, in at least one embodiment, the processor 52 may control the operation of chipsets 56, 58 to carry out at least a portion of the method described herein. More particularly, as discussed more below, the processor may be configured to execute instructions on memory 54 to execute Wi-Fi communication for short durations of time— e.g., rather than constantly—so that higher speed data transfer or communication may occur, but in which the transfer consumes vehicle power for a relatively shorter period of time (e.g., as opposed to running a Wi-Fi transceiver constantly).

Memory 54 may be coupled to the processor 52 and may include any non-transitory computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. In at least one implementation, the memory 54 includes non-volatile memory (e.g., ROM, EPROM, EEPROM, etc.). These of course are merely examples; other implementations are contemplated herein.

Chipsets 56, 58 also may each be coupled to the processor 52. The first and second chipsets 56, 58 are embodied herein as BLE and Wi-Fi chipsets, respectfully; however, it should be appreciated that the chipsets 56, 58 could use other SRWC protocols instead (as discussed above). Furthermore, while each chipset 56, 58 is shown separately, the chipsets may comprise a dual chipset instead. One such commercial implementation is the Broadcom BCM4354. This of course is merely an example; other implementations are also possible.

Each chipset 56, 58 includes a transceiver adapted permit suitable short range wireless communication. In addition, each transceiver may operate in different modes. For example, the BLE chipset 56 may operate in either a POWER ON mode or a POWER OFF mode. And for example, the Wi-Fi chipset 58 may operate in one of at least three different modes: a POWER OFF mode, a LOW ENERGY mode (e.g., a Power Save Mode or PSM), and a NORMAL POWER mode (e.g., a Constantly Awake Mode or CAM)—e.g., in accordance with IEEE 802.11x. NORMAL POWER mode may be fully operational Wi-Fi, whereas the LOW ENERGY mode includes a Wi-Fi mode that may be inactive for periods of time and which is not used to transmit content data, but instead is used merely to detect or listen for a Wi-Fi signal. In addition, in the LOW ENERGY mode, when a Wi-Fi signal is received and/or detected, the chipset 58 is configured to trigger and change modes (e.g., from the LOW ENERGY mode to the NORMAL POWER mode). For example, in some implementations, in the LOW ENERGY mode, the Wi-Fi chipset 58 is configured to sleep for periods of time and then periodically wake-up to determine whether another SRWC device has queued it. More particularly, chipset 58 may wake-up periodically for what is commonly referred to as a beacon frame (e.g., a frame of approximately 100 milliseconds). During the frame, if a Wi-Fi signal is detected, the chipset 58 automatically may switch to the NORMAL POWER mode. As the name suggests, the LOW ENERGY mode may consume substantially less power than the NORMAL POWER mode—e.g., because the chipset 58 does not transmit in this mode, and because it only periodically listens. As will be described in the method below, the processor 52 uses both chipsets 56, 58 to conserve vehicle power.

Method

A method 200 of receiving data from a wireless source at a short range wireless communication (SRWC) chipset (in the vehicle gateway module 44) is described below. The method is described with respect to an assembly line operating environment (see FIG. 1), wherein the vehicles 18 are conveyed along the assembly line 16, wherein the source 14 communicates VSM code/instructions or updates to the vehicle so that the vehicle 18 may program the VSMs 42 therein. Programming (also called flashing or reflashing) includes installing and/or updating software, firmware, or a respective operating system of a VSM 42 (e.g., configuring the local memory and local processors therein). Again, this assembly line embodiment is merely an example; other implementations are also possible. Method 200 begins with step 205, wherein an ignition state of the vehicle 18 is OFF; e.g., vehicles 18 may move along the assembly line in various states of assembly with their respective ignition states being OFF. In addition, in at least one embodiment, while the ignition state is OFF, the BLE chipset 56 may be in the POWER ON mode to carry out at least one aspect of method 200. In such embodiments, at step 205, the Wi-Fi chipset 58 may be powered OFF (i.e., in the POWER OFF mode).

In step 210 which follows, there may be relative motion between the vehicle 18 and the wireless source 14. For example, the vehicle 18 may move toward the source 14 (e.g., as in the illustrated assembly line example) or the source 14 may move toward the vehicle 18. For example, in the latter instance, mobile or personal sources could move toward the vehicle 18 (e.g., while vehicle ignition is OFF). In yet another example, a hotspot source may be inactive (e.g., not broadcasting) until the source 14 is within the range 20 of the vehicle 18. Then, the source 14 could be turned on or otherwise activated. Regardless of how step 210 is implemented, at some point in time, the source 14 becomes within SRWC range 20.

In step 215, the BLE chipset 56 (of vehicle 18) detects the BLE signal broadcasted by the source 14. In addition, the BLE signal may include or carry a parameter indicating that the hotspot 14 wishes to utilize Wi-Fi communication with the vehicle, or the BLE signal may include a command to the processor 52 instructing it to activate the Wi-Fi chipset 58. These are merely examples. Regardless of the type of indication, command, etc., the BLE signal may be used as a means to trigger Wi-Fi communication between the source 14 and vehicle 18.

Step 220 may follow step 215. In step 220, processor 52 may send a trigger signal to the Wi-Fi chipset 58 change modes (e.g., in response to step 215). More particularly, the trigger signal may change the Wi-Fi chipset 58 from the POWER OFF mode to the LOW ENERGY mode—e.g., so that the Wi-Fi chipset 58 can determine whether a suitable Wi-Fi communication is being attempted. Thus, the processor may trigger the Wi-Fi chipset in an inactive mode (e.g., POWER OFF mode) to wake-up to an active mode (e.g., as used herein, both LOW ENERGY mode and NORMAL POWER mode are active modes).

In response to the trigger signal sent in step 220, chipset 58 may change from the POWER OFF mode to the LOW ENERGY mode (step 225). As explained above, using the Wi-Fi chipset 58 may be desirable as faster wireless communications can be accomplished—e.g., especially when the source 14 is used to deliver relatively large or larger quantities of content data to the vehicle 18 (e.g., such as VSM programming instructions, the VSM operating system (OS), etc.). Content data as used herein includes any suitable payload data. And according to one embodiment, content data includes packet data that includes various programming instructions tailored for the respective VSMs 42, and programming includes installing the instructions in the VSM(s). These instructions may be original instructions or they may be updates. For example, updates may be instructions to overwrite, modify, or replace previously-installed instructions.

In step 230 which follows the trigger of step 225, the Wi-Fi chipset 58 determines whether the wireless source 14 is transmitting data intended for chipset 58 (vehicle 18). This may include determining whether the data or data packets being transmitted by source 14 is queued for the respective gateway module 44, the chipset 58, etc. When the processor 52 in step 230 determines that the source 14 is communicating with it, method 200 proceeds to step 240. When step 230 determines that the source 14 is not communicating with it, then the method 200 proceeds to step 235.

In step 235, the Wi-Fi chipset 58 may remain in the LOW POWER mode (e.g., to conserve vehicle power). The method 200 loops back and repeats step 230 (repetitively in some instances) until either the Wi-Fi chipset 58 determines it has been queued or until the Wi-Fi chipset 58 times-out. Timing out may occur if the Wi-Fi chipset remains in the LOW POWER mode for a predetermined period of time without being queued; this predetermined period of time may be stored in memory 54. When processor 52 determines that the chipset 58 has timed out, the Wi-Fi chipset may switch/return to the POWER OFF mode (and method 200 may resume only upon receiving another trigger via a BLE signal, as described in step 215). Further, it should be appreciated that in at least one embodiment, the BLE chipset 56 at this time may remain in the POWER ON mode.

In step 240, when the chipset 58 has been queued, then chipset 58 automatically may switch or change from the LOW ENERGY mode to the NORMAL POWER mode so that the chipset 58 may begin to receive data. The chipset 58 may be configured accordingly (e.g., executing dedicated instructions thereon) or this automatic switch may be according to instructions stored at processor 52.

While steps 225-240 include the Wi-Fi chipset 58 transitioning from POWER OFF mode to the LOW POWER mode to the NORMAL mode, this is not required. In at least some embodiments, the trigger received in step 215 and the trigger signal sent via processor 52 to the Wi-Fi chipset 58 in step 220 could actuate the Wi-Fi chipset 58 from POWER OFF mode to the NORMAL mode. Thus, in at least one embodiment, no LOW POWER mode needs to be utilized. When LOW POWER mode is utilized however, additional vehicle electrical power may be conserved.

In step 245 which follows step 240, the Wi-Fi chipset 58 receives content data from the wireless source 14. In the illustrated implementation, the content data includes code and/or instructions pertinent to one or more VSMs 42; of course, other content data may be received instead.

In at least one embodiment (step 250), the content data received in step 245 is used to install instructions in the one or more VSMs 42. More particularly, gateway module 44 may extract the code and/or instructions from the received content data and thereafter install the code, instructions, or both in the respective VSM(s). In this manner, the content data may be provided to the vehicle 18, and vehicle 18 may use the content data to flash or reflash instructions of the respective VSMs 42. Thereafter, the method 200 may end.

It should be appreciated that once the source 14 ceases transmitting any data intended for the Wi-Fi chipset 58 for a predetermined period of time, the Wi-Fi chipset 58 may enter either the LOW POWER mode, the POWER OFF mode, or both. In one non-limiting embodiment, the chipset may switch first to the LOW POWER mode (e.g., for a first period of time) and then ultimately the POWER OFF mode (e.g., for a second period of time).

In some embodiments, multiple sources 14 may be used along a vehicle manufacturing assembly line—e.g., each providing content data for different VSMs 42. Furthermore, multiple hotpots 14 could provide content data for a single VSM 42 or for multiple VSMs 42. In another embodiment, at least one source 14 transmits a batch of content data (e.g., multiple sets of programming instructions) for multiple VSMs 42.

Other embodiments also exist. For example, method 200 includes optional steps 260 and 265. In at least one implementation, the processor 52 (using the BLE signal) determines or qualifies (or pre-qualifies) the source 14 prior to triggering the Wi-Fi chipset 58 to power on (e.g., prior to step 220). For example, steps 260 and 265 may occur between steps 215 and 220. In step 260, the processor 52 determines an identifier of the source 14 based on the received BLE signal (e.g., a name of the wireless source; e.g., a service set identifier or SSID). Step 260 also may include determining a connectivity status of the wireless source 14—i.e., whether the source 14 is connected to a network source such as the internet (or an intranet). Thus, step 260 may include the processor 52, the BLE chipset 56, or both determining the identification and connectivity status of the source 14 before triggering the Wi-Fi chipset 58.

Next, in optional step 265, the BLE chipset 56 (and/or processor 52) determine whether the identifier and the connectivity status are in accordance with a desired source. For example, the processor 52 may be configured at the vehicle manufacturer to recognize or identify a particular set of identifiers (e.g., stored in memory 54). According to one embodiment, the method 200 proceeds to step 220 when both the identifier and the connectivity status are recognized and considered desirable. For example, the method 200 proceeds from step 265 to step 220 when the BLE chipset 36 and/or processor 52 recognize the name of the wireless source 14 as a preferred network and recognize the connectivity status as active (i.e., the source 14 is connected to server 12 or the internet 22). In at least one embodiment, preferred sources 14 include preselected source(s) at a vehicle manufacturing facility. In at least one other embodiment, a preferred source may be designated by a user of the gateway module 44, an authorized service technician, or the like.

Alternatively, when the BLE chipset 36 and/or processor 52 do not recognize the name of the wireless source 14 as a preferred network, do not recognize the connectivity status as active, or both, method 200 proceeds to step 215. That is, e.g., Wi-Fi chipset 58 remains in the POWER OFF mode and the BLE chipset 56 may continue to listen for a BLE signal having a different and suitable SSID or the like.

Still other embodiments exist. As discussed briefly above, non-assembly line embodiments exist—e.g., where conservation of vehicle electrical power is desirable. One particular implementation includes an electric or hybrid vehicle. As used here, an electric vehicle is one that is not a combustion vehicle, but uses electricity for propulsion. Skilled artisans will appreciate that such vehicles power on and off repetitively during use/driving—e.g., to conserve electrical energy. In these implementations, the gateway module 44 may be at least partially powered OFF when the vehicle is powered off to conserve vehicle battery power. During this period, the Wi-Fi chipset 58 could be in the POWER OFF mode while the BLE chipset 56 is in the POWER ON mode;

thus, as described above, the BLE chipset 56 could trigger the Wi-Fi chipset to one or both active modes (e.g., LOW POWER mode or NORMAL POWER mode).

Thus, there has been described a vehicle having a gateway module that utilizes at least two short-range wireless communication (SRWC) protocols. In one embodiment, the two SRWC protocols include Bluetooth Low Energy and Wi-Fi, and the gateway module includes two corresponding SRWC chipsets (e.g., a BLE chipset and a Wi-Fi chipset). According to the methods described herein, one of the SRWC chipsets is active (or powered ON) when the vehicle is powered down/off and is used to wake up an inactive SRWC chipset (or one powered OFF). According to an exemplary embodiment, the two SRWC chipsets have different electrical characteristics—e.g., one has faster throughput rates but uses more power, whereas the other uses less power but has slower throughput rates. Thus, according to one embodiment, the SRWC chipset that uses less power remains active while the vehicle ignition is OFF or in a low power state, and the other SRWC chipset, which has a higher data throughput, is selectively activated to wake up and perform SRWC communication. In this manner, power can be conserved by not constantly running the SRWC chipset that consumes more power, while faster throughput rates may be utilized when there is data ready to be received at the gateway module from a SRWC source.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of receiving data from a wireless source via a short range wireless communication (SRWC) chipset in a vehicle, comprising the steps of:
   detecting the wireless source using a first SRWC chipset in a gateway module in the vehicle;
   in response to detecting the wireless source with the first SRWC chipset, triggering a second SRWC chipset in the gateway module to wake-up by exiting a POWER OFF mode, wherein the first and second SRWC chipsets are configured to communicate according to different SRWC protocols; and
   in response to the triggering step:
      exiting the POWER OFF mode at the second SRWC chipset;
      operating the second SRWC chipset in a LOW POWER mode;
      determining in the LOW POWER mode at the second SRWC chipset whether the wireless source is communicating or is attempting to communicate data intended for the second SRWC chipset;
      when the second SRWC chipset determines that the wireless source is communicating or is attempting to communicate data intended for the second SRWC chipset, then switching from the LOW POWER mode to a NORMAL POWER mode; and
      in the NORMAL POWER mode, receiving content data from the wireless source at the gateway module via the second SRWC chipset.

2. The method of claim 1, wherein the first SRWC chipset is configured to communicate using a Bluetooth Low Energy (BLE) protocol, wherein the second SRWC chipset is configured to communicate using a Wi-Fi protocol.

3. The method of claim 1, wherein the detecting, triggering, exiting, and receiving steps occur when an ignition state of the vehicle is OFF.

4. The method of claim 3, wherein, at least one of the detecting, triggering, exiting, and receiving steps occur while the vehicle is being conveyed via a vehicle assembly line, wherein the received data is received from a server located at a vehicle manufacturing facility via the wireless source.

5. The method of claim 1, further comprising the step of: using the received content data, programming at least one vehicle system module (VSM) in the vehicle.

6. The method of claim 1, wherein, in accordance with an IEEE 802.11 standard, the LOW POWER mode is POWER SAVE mode (PSM) and the NORMAL POWER mode is CONSTANTLY AWAKE mode (CAM).

7. The method of claim 1, further comprising: when in the NORMAL POWER mode content data from the wireless source ceases to be received, then switching at the second SRWC chipset from the NORMAL POWER mode to one of the LOW POWER mode or the POWER OFF mode.

8. A vehicle gateway module adapted to communicate using short range wireless communication (SRWC), comprising:
   a first SRWC chipset;
   a second SRWC chipset, wherein the first and second SRWC chipsets are configured to communicate according to different SRWC protocols;
   a processor coupled to the first and second SRWC chipsets; and
   memory coupled to the processor, said memory storing instructions executable by the processor, wherein the instructions comprise:
      determining at the processor that a vehicle ignition state is OFF; and
      in response to receiving the determination:
         detecting at the first SRWC chipset a wireless signal from a SRWC source while the vehicle ignition state is OFF, wherein the wireless signal includes a trigger associated with the second SRWC chipset;
         in response to receiving the trigger, switching the second SRWC chipset from a POWER OFF mode to a LOW POWER mode;
         determining that the SRWC signal is a communication intended for the second SRWC chipset; and
         in response the determination, switching the second SRWC chipset from the LOW POWER mode to a NORMAL mode and receiving content data from the SRWC source.

9. The vehicle gateway module of claim 8, wherein the first SRWC chipset is configured to communicate using a Bluetooth Low Energy (BLE) protocol, wherein the second SRWC chipset is configured to communicate using a Wi-Fi protocol.

10. The vehicle gateway module of claim 8, further comprising, in response to determining at the processor that the vehicle ignition is OFF, programming at least one vehicle system module (VSM) in a vehicle using the received content data, wherein the programming step is further in response to receiving content data at the second SRWC chipset in the NORMAL mode.

11. The vehicle gateway module of claim 8, wherein, in accordance with an IEEE 802.11 standard, the LOW POWER mode is POWER SAVE mode (PSM) and the NORMAL POWER mode is CONSTANTLY AWAKE mode (CAM).

12. The vehicle gateway module of claim 8, further comprising, in response to switching to the NORMAL POWER mode and receiving content data, when in the NORMAL POWER mode content data from the SRWC source ceases to be received, then switching at the second SRWC chipset from the NORMAL POWER mode to one of the LOW POWER mode or the POWER OFF mode.

13. A method of receiving data from a wireless source via a short range wireless communication (SRWC) chipset in a vehicle, comprising the steps of:
   detecting the wireless source using a first SRWC chipset in a gateway module in the vehicle, wherein the wireless source is located at a vehicle manufacturing facility;
   in response to detecting the wireless source with the first SRWC chipset, triggering a second SRWC chipset in the gateway module to wake-up by exiting a POWER OFF mode, wherein the first and second SRWC chipsets are configured to communicate according to different SRWC protocols; and
   in response to the triggering step:
      exiting the POWER OFF mode at the second SRWC chipset;
      operating the second SRWC chipset in a LOW POWER mode;
      determining in the LOW POWER mode at the second SRWC chipset whether the wireless source is communicating or is attempting to communicate data intended for the second SRWC chipset;
      when the second SRWC chipset determines that the wireless source is communicating or is attempting to communicate data intended for the second SRWC chipset, then switching from the LOW POWER mode to a NORMAL POWER mode; and
      in the NORMAL POWER mode, receiving content data from the wireless source at the gateway module via the second SRWC chipset; and
      using the received content data, programming at least one vehicle system module (VSM) in the vehicle.

14. The method of claim 13, wherein the detecting step occurs at the first SRWC chipset when the vehicle is moved within a SRWC range of the wireless source.

15. The method of claim 13, further comprising: timing out at the second SRWC chipset, wherein timing out includes ceasing to receive content data in the NORMAL POWER mode for a predetermined period of time; and when the second SRWC chipset times out, then switching at the second SRWC chipset from the NORMAL POWER mode to one of the LOW POWER mode or the POWER OFF mode.

\* \* \* \* \*